United States Patent
Neidlein

(10) Patent No.: US 8,523,032 B2
(45) Date of Patent: Sep. 3, 2013

(54) DEVICE FOR FASTENING A ROOF RACK SYSTEM

(75) Inventor: Harald Neidlein, Stuttgart (DE)

(73) Assignee: Dr. Ing. H.C. F. Porsche Aktiengesellschaft (DE)

( * ) Notice: Subject to any disclaimer, the term of this patent is extended or adjusted under 35 U.S.C. 154(b) by 985 days.

(21) Appl. No.: 12/604,482

(22) Filed: Oct. 23, 2009

(65) Prior Publication Data

US 2010/0155442 A1    Jun. 24, 2010

(30) Foreign Application Priority Data

Dec. 20, 2008  (DE) .......... 10 2008 064 346

(51) Int. Cl.
*B60R 9/04* (2006.01)

(52) U.S. Cl.
USPC ........... 224/321; 224/326; 224/556; 224/549

(58) Field of Classification Search
USPC ............. 224/321, 326, 319, 322, 325, 329, 224/330; 296/210, 213, 37.7; 410/100, 107, 410/111
See application file for complete search history.

(56) References Cited

U.S. PATENT DOCUMENTS

| | | | | |
|---|---|---|---|---|
| 3,165,353 A | * | 1/1965 | Weise | 296/210 |
| 3,542,264 A | * | 11/1970 | Meyer et al. | 224/42.34 |
| 4,616,771 A | * | 10/1986 | Heideman | 224/321 |
| 4,768,691 A | * | 9/1988 | Stapleton | 224/321 |
| 5,860,576 A | * | 1/1999 | Duran | 224/326 |
| 5,979,723 A | * | 11/1999 | Tress et al. | 224/326 |
| 7,226,101 B2 | * | 6/2007 | Raffler | 296/29 |
| 2005/0104418 A1 | * | 5/2005 | Zirbs | 296/210 |
| 2007/0194069 A1 | * | 8/2007 | Binder et al. | 224/326 |
| 2008/0272624 A1 | | 11/2008 | Donicke | |
| 2009/0145941 A1 | * | 6/2009 | Kiyota | 224/326 |

FOREIGN PATENT DOCUMENTS

| | | |
|---|---|---|
| DE | 4308808 C1 | 3/1994 |
| DE | 19828234 A1 | 12/1999 |
| DE | 19954835 A1 | 5/2001 |
| DE | 102007020917 A1 | 11/2008 |
| EP | 0325876 A1 | 8/1989 |

OTHER PUBLICATIONS

German Search Report dated Jul. 17, 2009.

* cited by examiner

*Primary Examiner* — Justin Larson
*Assistant Examiner* — Corey Skurdal
(74) *Attorney, Agent, or Firm* — Gerald E. Hespos; Michael J. Porco; Matthew T. Hespos

(57) ABSTRACT

A device for fastening a roof rack system contains, as a supporting element, a base plate with two supporting arms which can be respectively pivoted about an axis into an operative position and inoperative position. In the operative position, the supporting arms are vertically oriented in parallel and spaced apart from each other and, in the inoperative position, the supporting arms are folded up into a roof slot facing each other in a horizontal plane.

18 Claims, 5 Drawing Sheets

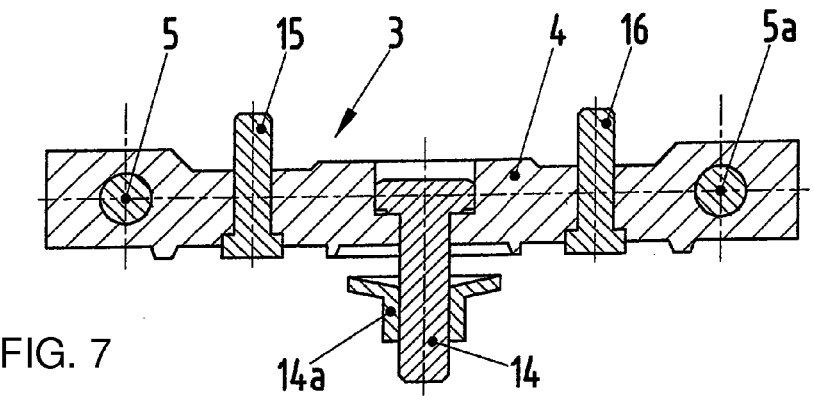
FIG. 7
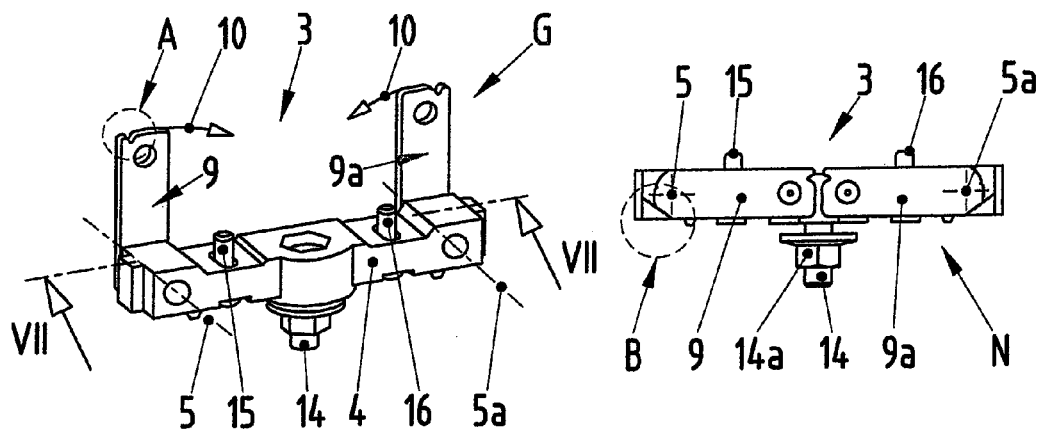
FIG. 8
FIG. 9
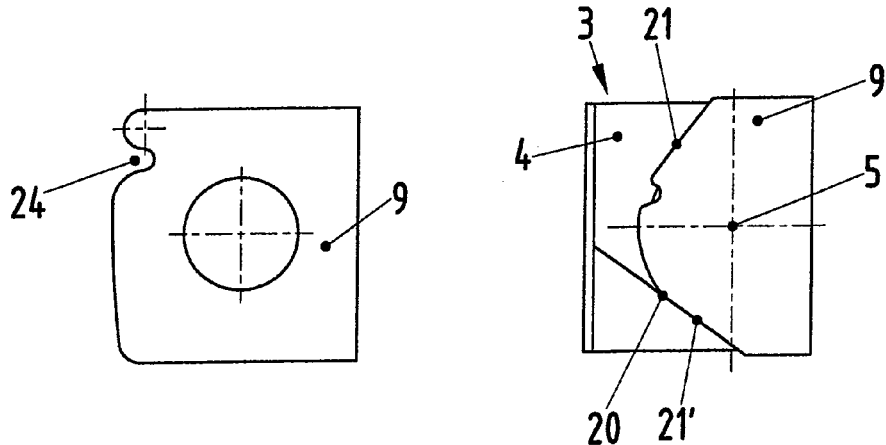
FIG. 10
FIG. 11

DEVICE FOR FASTENING A ROOF RACK SYSTEM

CROSS-REFERENCE TO RELATED APPLICATION

This application claims the priority, under 35 U.S.C. §119, of German application DE 10 2008 064 346.7, filed Dec. 20, 2008; the prior application is herewith incorporated by reference in its entirety.

BACKGROUND OF THE INVENTION

Field of the Invention

The invention relates to a device for fastening a roof rack system to a motor vehicle roof via supporting elements which are connected to the vehicle body and contain pivotable supporting arms which can be connected to a transverse strut of the roof rack system.

Published, non-prosecuted German patent application DE 199 54 835 A1 discloses a motor vehicle roof with a roof rack fastened thereto via supporting feet. The supporting feet are each arranged in depressions of the motor vehicle roof and can be pivoted about a positionally fixed axis from a rest position located in the recess into an operative position projecting upward out of the roof contour. The supporting feet are of a two-part configuration and contain a strut articulated in a pivotable manner about an axis, and a support which is articulated at the free end of the strut and can be latched on the end side to the roof.

SUMMARY OF THE INVENTION

It is accordingly an object of the invention to provide a device for fastening a roof rack system that overcomes the above-mentioned disadvantages of the prior art devices of this general type, which roof rack system can be integrated in a vehicle roof and can be connected fixedly and securely to the roof structure in a simple manner.

With the foregoing and other objects in view there is provided, in accordance with the invention, a device for fastening a roof rack system to a motor vehicle roof. The device contains supporting elements connected to a vehicle body and contain pivotable supporting arms for connecting to a transverse strut of the roof rack system. Each of the supporting elements further have a base plate with two supporting arms which can be respectively pivoted about an axis into an operative position and an inoperative position. In the operative position, the supporting arms can be pivoted in a manner vertically oriented in parallel and spaced apart from each other out of a longitudinally extending roof slot of the motor vehicle roof and, in the inoperative position, the supporting arms are folded up facing each other in a horizontal plane and concealed within the longitudinally extending roof slot in a manner bearing against the base plate.

The advantages primarily obtained with the invention are that the device for fastening the roof rack system to a vehicle roof can be integrated in the roof structure of the vehicle in a simple manner of installation and is arranged such that it is both concealed and continuously available and can be connected fixedly to the roof structure and adjusted with simple handling into an operative and inoperative position. This is advantageously achieved according to the invention in that the supporting element contains a base plate with two supporting arms which can be respectively pivoted about an axis into an operative and inoperative position and, in the operative position, can be pivoted in a manner vertically oriented in parallel and spaced apart from each other out of a longitudinally extending roof slot and, in the inoperative position, are folded up facing each other in a horizontal plane and concealed within the roof slot in a manner bearing against the base plate.

According to the invention, the base plates are preferably arranged approximately in each case at the corners of the roof between a lateral roof pillar of the vehicle body and below the vehicle roof and are connected to a side pillar or limbs of the side pillar via fastening screws. The arrangement of the base plate between the roof frame and the lateral roof pillar of the vehicle body results in fixed positioning of the base plate, particularly since the latter is still embedded in a recess of the roof frame and is held such that its top side is supported in a planar manner on the recess. This also results in a support in the transverse direction.

According to the invention, the base plate is fastened preferably to limbs of the roof pillar via a centrally arranged fastening screw, the fastening screw being secured via a screw nut arranged on the inside. Furthermore, the base plate is fixed directly to the roof frame via further fastening screws arranged on either side of the central fastening screw. This arrangement of the fastening screws permits fastening in the vehicle roof to stable structural parts with a large base on both sides.

Furthermore, according to the invention, so that the supporting arms, which are pivoted out in the operative position, can take up a position secured against folding over, the base plate has an obliquely positioned supporting surface for the adjustable supporting arms, in each case at those ends of the two supporting arms which face the pivot axes. The supporting surface, in an operative position of the supporting arms, is in engagement in a clamping manner with a corresponding oblique surface of the respective supporting arm and holding the supporting arm in the vertical operative position.

For the fixed and secure connection of the supporting arms to the roof rack system, the free upper ends of the supporting arms are arranged in a form-fitting manner in a mount between ribs of a roof rack foot of the transverse member of the roof rack system and are held via a connecting device arranged in corresponding bores. This form-fitting connection between the roof rack foot of the roof rack system and the supporting arms is advantageous in particular for absorbing forces which occur in the event of a crash.

Furthermore, according to the invention, a seal which surrounds the fastening screw and covers a bore is provided between the underside of the base plate and the limbs of the roof pillar. The sealing arrangement ensures that water cannot enter the roof structure from the outside. The roof slot is covered above the base plate preferably by a clip-in or plug-in covering which closes the roof slot to the outside.

Other features which are considered as characteristic for the invention are set forth in the appended claims.

Although the invention is illustrated and described herein as embodied in a device for fastening a roof rack system, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE SEVERAL VIEWS OF THE DRAWING

FIG. 7 is a diagrammatic, vertical sectional view through the base plate taken along the line VII-VII shown in FIG. 8;

FIG. 8 is a diagrammatic, perspective view of the base plate with the supporting arms in the operative position;

FIG. 9 is a diagrammatic, side perspective view of the base plate with the supporting arms in the inoperative position;

FIG. 10 is an enlarged illustration of detail A of the supporting arms with a notch for a handling tool;

FIG. 11 is an enlarged illustration of the detail B of the supporting arm with support on the base plate;

DETAILED DESCRIPTION OF THE INVENTION

Figure 1:
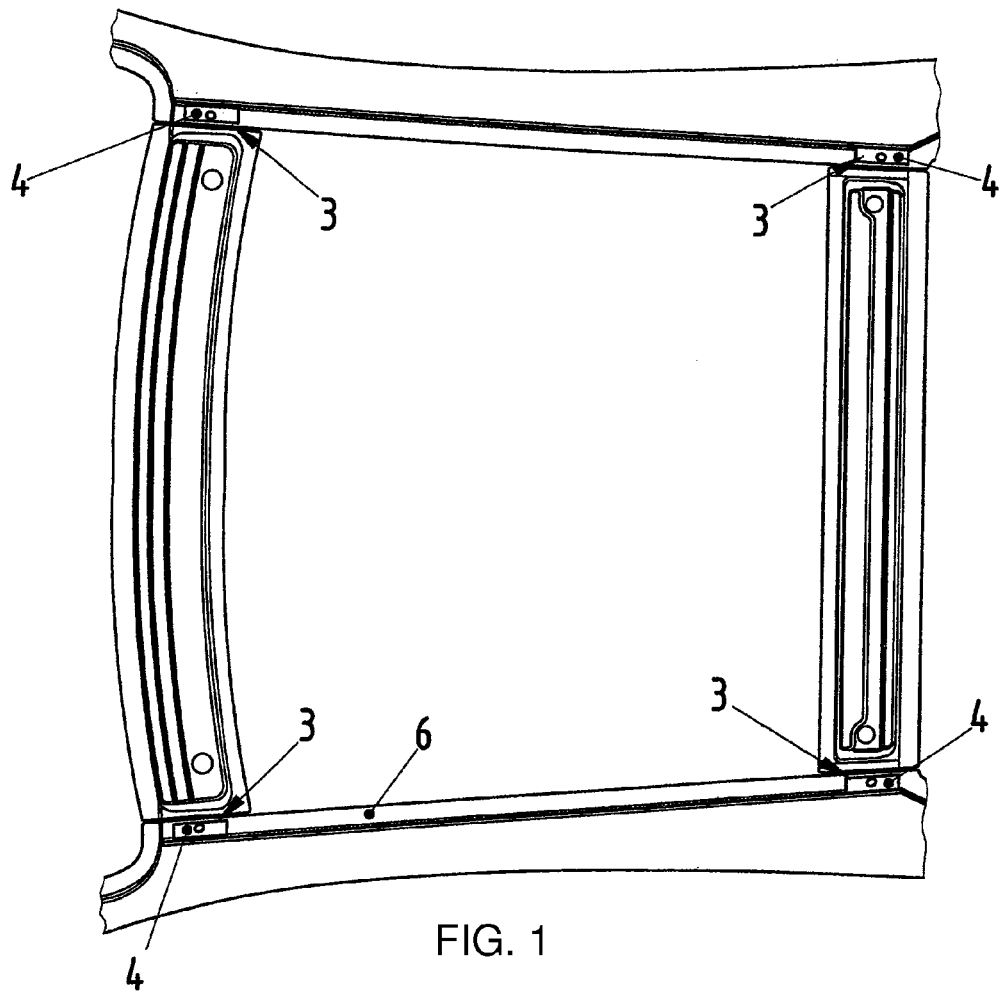
FIG. 1 is a diagrammatic, top view of a vehicle roof with lateral and transverse pillars of a roof structure and with a fastening device, arranged at the corners, for a roof rack system according to the invention.
Figure 2:
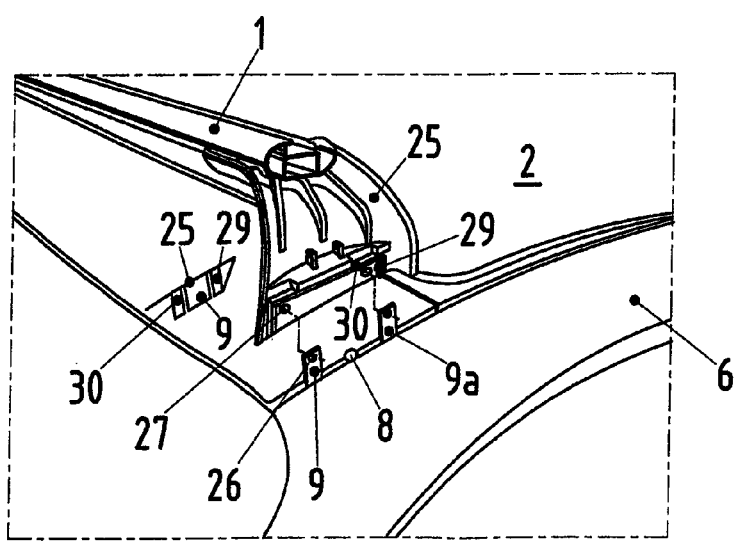
FIG. 2 is a diagrammatic, perspective view of the fastening device in an operative position for the roof rack system.
Figure 3:
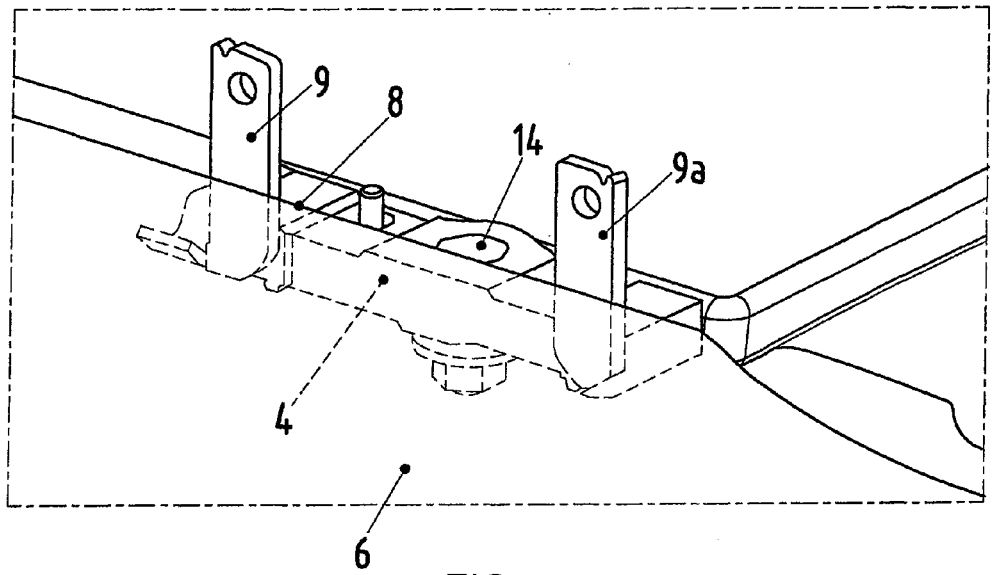
FIG. 3 is a diagrammatic, perspective view of an inserted base plate of the fastening device with supporting arms in the operative position.
Figure 4:
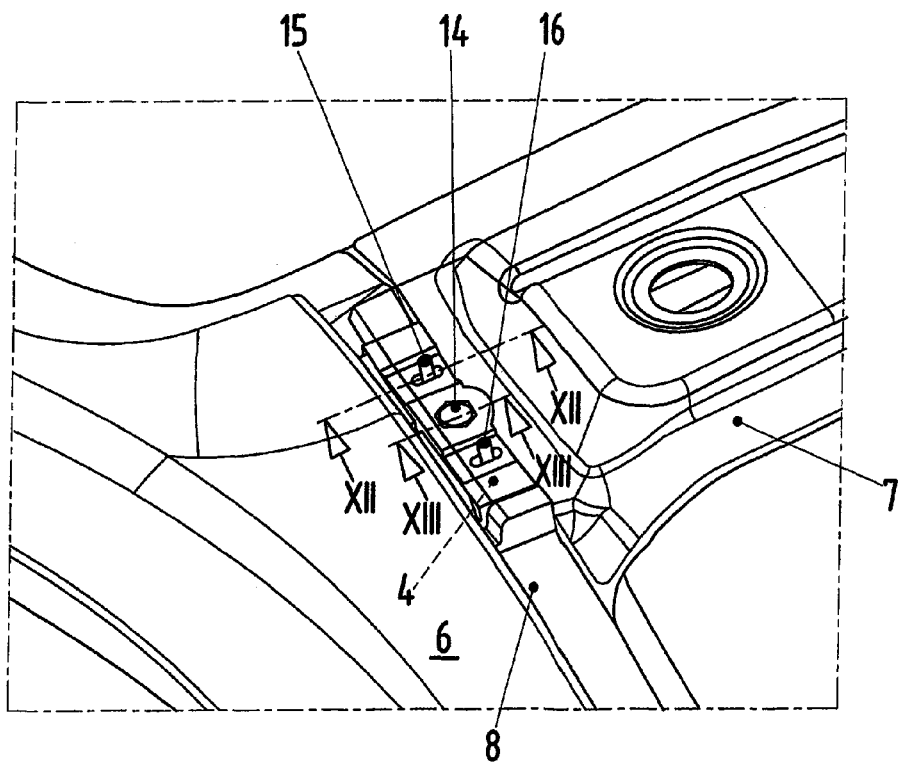
FIG. 4 is a diagrammatic, top perspective view of the base plate in an arrangement between the roof frame and side pillar of the roof structure.
Figure 5:
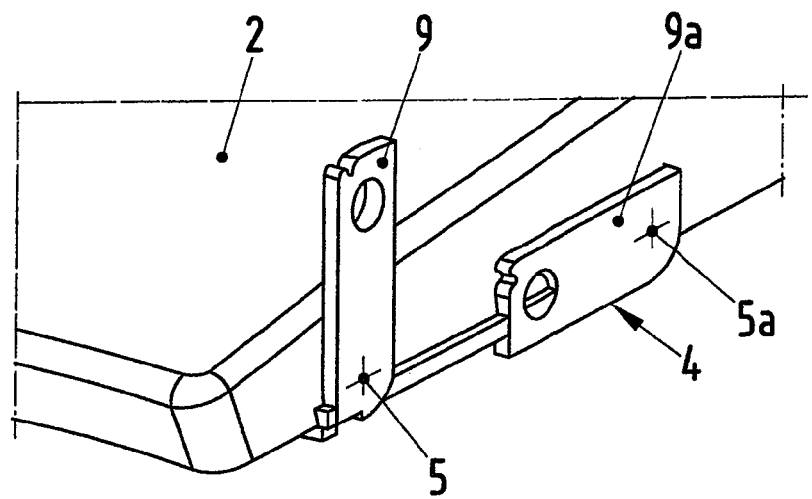
FIG. 5 is a diagrammatic, side perspective view of the base plate with the supporting arms.
Figure 6:
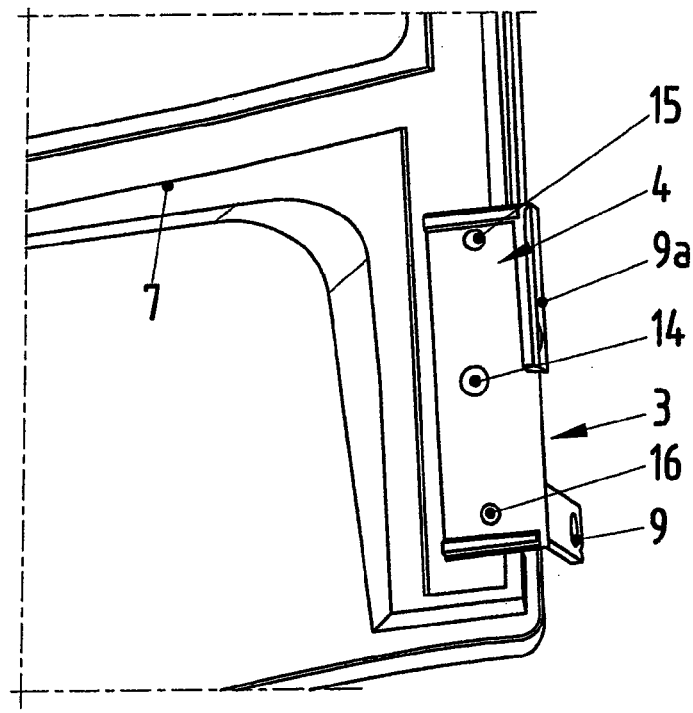
FIG. 6 is a diagrammatic, perspective view of the base plate fastened to the roof frame.
Figure 12:
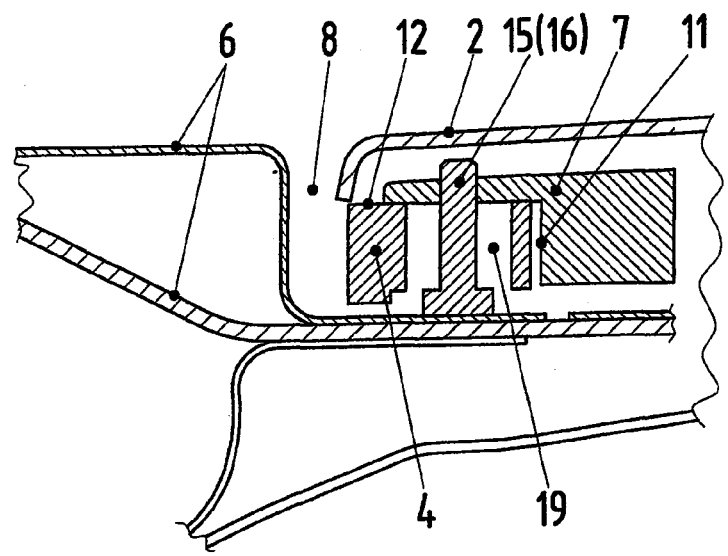
FIG. 12 is a diagrammatic, sectional view taken along the line XII-XII shown in FIG. 4 through the lateral fastening screw.

Referring now to the figures of the drawing in detail and first, particularly, to FIG. 1 thereof, there is shown a device for fastening a roof rack system 1 to a motor vehicle roof 2 and includes supporting elements 3 which are each arranged at the corners of the roof 2 and have supporting arms 9, 9a. The supporting elements 3 contain a rectangular base plate 4 with the supporting arms 9, 9a which can be respectively pivoted about a pivot axis 5, 5a into an operative position G (see FIG. 8) and into an inoperative position N (see FIG. 9). The base plate 4 of the supporting element 3 is integrated in the vehicle roof 2 and is arranged between a roof pillar 6 and a reinforcing roof frame 7, which is shown in more detail in FIGS. 12 and 13. In the inoperative position N, the supporting arms 9, 9a are concealed in a longitudinally extending roof slot 8 and, in the operative position G, protrude over the roof 2.

The supporting arms 9, 9a are articulated on the end sides on the base plate 4 of the supporting element 3 about the pivot axes 5, 5a and are held spaced apart from each other. In the operative position G, the supporting arms are parallel to each other in a vertical arrangement (FIG. 8). In order to take up the inoperative position N, the supporting arms 9, 9a are pivoted in opposite directions in the arrow direction 10 until they are concealed in a common horizontal plane (FIG. 9).

The base plate 4 is embedded in a recess 11 or similar mount of the roof frame 7 and bears with its top side 12 in a planar manner on the recess 11. The base plate 4 is connected to the roof frame 7 via further fastening screws 15 and 16 arranged on either side of a central fastening screw 14. The roof frame 7 is preferably composed of plastics material, and the fastening screws 15, 16 are screwed directly into the roof frame 7. Threaded inserts in the plastic frame 7 are also possible. In order to adjust the base plate 4, the fastening screws 15, 16 are arranged in transversely directed elongated holes 19.

The central fastening screw 14 is screwed to the lateral roof pillar 6 or the corresponding limbs 6a of the roof pillar 6 and fixed via a screw nut 14a. A seal 18 or a sealant is provided to seal the bore for the fastening screw 14.

In order to support the supporting arms 9, 9a in the upright operative position G, the base plate 4 is provided with a supporting slope 20 which interacts in a corresponding manner with an oblique surface 21 of the supporting arms 9, 9a (see FIG. 11). By the direct bearing of the oblique surface 21 of the supporting arms 9, 9a against the supporting slope 20, pivoting of the supporting arms 9, 9a beyond the vertical position is prevented by clamping. In the folded-up inoperative position N, an oblique surface 21' of the supporting arms 9, 9a bears against the supporting slope 20 such that the supporting arms 9, 9a are fixed in this position.

In order to simplify the handling of the supporting arms 9, 9a to pivot the latter out of the folded-up inoperative position N into the upwardly pivoted operative position G, the free ends of the supporting arms 9, 9a are each provided with a notch 24 into which a handling tool can be inserted, via which the supporting arms 9, 9a can be pivoted out of the roof slot 8.

The free ends of the supporting arms 9, 9a are connected to a roof rack foot 25 via screwing measures which are held in bores 26, 27 of the supporting arms 9, 9a and of the roof rack foot 25.

To accommodate the free ends of the supporting arms 9, 9a in a form-fitting manner, the roof rack foot 25 has a mount with lateral, parallel ribs 29, 30 between which the free ends of the supporting arms 9, 9a are held.

Figure 13:
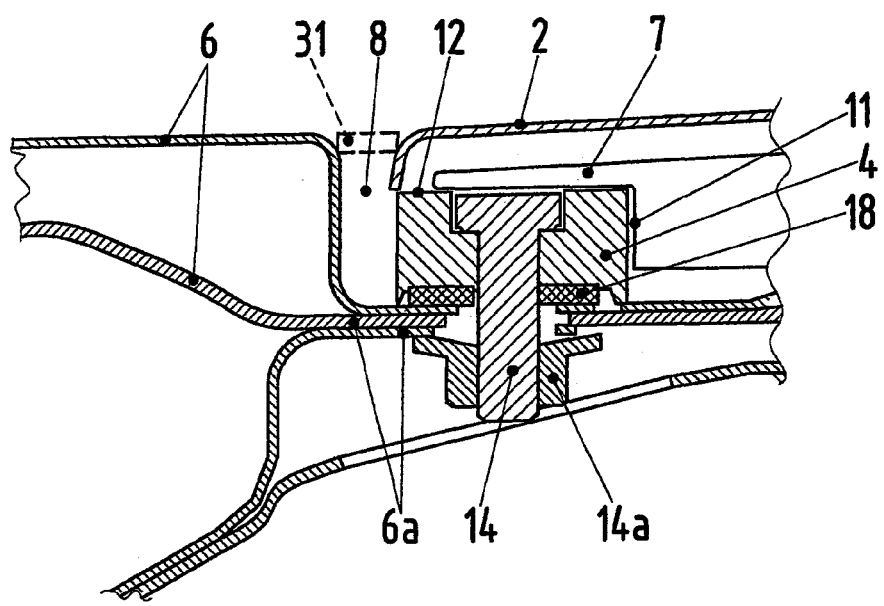
FIG. 13 is a diagrammatic, sectional view taken along the line XIII-XIII shown in FIG. 4 through a central fastening screw.

First of all, the base plates 4 of the supporting elements 3 are preassembled on the motor vehicle roof 2 (for example at the supplier). The base plates 4 are fastened to the roof pillar 6 only after the motor vehicle roof has been inserted into the vehicle (in this case by adhesive bonding). By the longitudinally extending roof slots 8, which are approximately twice as wide as the supporting arms, the supporting arms 9, 9a can be pivoted out of the inoperative position N into the operative position G. In the inoperative position N, the roof slot 8 is closed via a clip-in covering 31, which is indicated in FIG. 13 by dashed lines.

The invention claimed is:

1. A device for fastening a roof rack system to a roof of a motor vehicle, the roof having slots extending in a longitudinal direction along the roof, the device comprising: supporting elements connected to a vehicle body, each of said supporting elements having a base plate and two supporting arms pivotally mounted to the base plate so that the arms can be respectively pivoted about axes transverse to the longitudinal direction between an operative position and an inoperative position and, in the operative position, said supporting arms are vertically oriented, parallel, spaced apart from each other, and projecting out of one of the longitudinally extending slots of the roof and, in the inoperative position, said supporting arms being folded up facing each other in a horizontal plane and concealed within the respective longitudinally extending roof slot in a manner bearing against said base plate, each of the base plates having oblique supporting surfaces in proximity to ends of the supporting arms that are pivotally connected to the base plate, said oblique supporting surfaces being engaged in a clamping manner with corresponding oblique surfaces of said supporting arms when the supporting arms are in the operative position for holding the respective supporting arm in the vertical operative position.

2. The motor vehicle roof of claim 1, wherein said supporting arms have free upper ends disposed in a form-fitting manner in a mount between ribs of a roof rack foot of the transverse member of the roof rack system and are held via connecting means arranged in corresponding bores.

3. The motor vehicle roof of claim 1, further comprising a clip-in covering cap for closing to an outside the longitudinally extending roof slot.

4. A motor vehicle roof, comprising: lateral roof pillars extending in a longitudinal direction of the vehicle; a roof frame inward of the lateral roof pillars; slots in the motor vehicle roof extending in the longitudinal direction of the motor vehicle at positions outward of the roof frame; and supporting elements for fastening a roof rack system to the motor vehicle roof, each of the supporting elements having a base plate fastened to the roof frame and to one of the lateral roof pillars and limbs of the lateral roof pillar via said fastening screws, and two supporting arms pivotally mounted to the base plate so that the arms are pivotable about axes transverse to the longitudinal direction between an operative position where the supporting arms are vertical, spaced apart, and projecting out of one of the slots of the roof and an inoperative position where the supporting arms are concealed within the respective slot and bearing against the base plate.

5. The motor vehicle roof of claim 4, wherein said base plate is embedded in a recess of the roof frame and is held such that a top side of said base plate is supported in a planar manner in the recess on the roof frame.

6. The motor vehicle roof of claim 4, wherein the fastening screws include a centrally disposed fastening screw and a screw nut, said base plate is connected via said centrally disposed fastening screw to the limbs of the lateral roof pillar and is secured via said screw nut disposed on an inside.

7. The motor vehicle roof of claim 6, wherein said base plate has a bore formed therein for receiving said centrally disposed fastening screw; and further comprising a seal surrounding said centrally disposed fastening screw and covering said bore, said seal disposed between an underside of said base plate and the limbs of the lateral roof pillar.

8. The motor vehicle roof of claim 6, wherein the fastening screws further comprise further fastening screws, said base plate is fixed directly in the roof frame via said further fastening screws disposed on either side of said centrally disposed fastening screw.

9. The motor vehicle roof of claim 8, wherein said base plate has elongated holes formed therein; and said further fastening screws are disposed in said elongated holes, which are oriented transversely with respect to the longitudinal direction to adjust said base plate.

10. The motor vehicle roof of claim 4, wherein said supporting arms have free ends facing each other in the inoperative position, said free ends each having a notch formed therein into which a handling tool can be hooked for pivoting said supporting arms upward out of the inoperative position into the operative position.

11. The motor vehicle of claim 6, wherein said base plate has a bore formed therein for receiving the central fastening screw; and further comprising a seal surrounding the central fastening screw and covering the bore, the seal being disposed between an underside of the base plate and the limbs of the lateral roof pillar.

12. A motor vehicle, comprising:
a roof having lateral roof pillars extending substantially in a longitudinal direction of the vehicle and disposed at opposite lateral sides of the vehicle and a reinforcing roof frame disposed between the lateral roof pillars, slots extending in the longitudinal direction outward of the roof frame; and
supporting elements arranged at corners of the roof and in proximity to the respective slots, each of said supporting elements having a base plate and first and second arms pivotably attached to a side of each of the base plates and being pivotable about axes extending transverse to the longitudinal direction so that the first and second arms are pivotable pivot between an operative position in which the first and second arms extend substantially vertically from the respective slot and above the roof, and an inoperative position in which the arms extend substantially horizontally along the side of the base plate and within the respective slot, wherein the arms in the operative position are connectable to a transverse strut of a roof rack system.

13. The motor vehicle of claim 12, wherein each of the base plates is fastened to the roof frame and to one of the lateral roof pillars.

14. The motor vehicle of claim 13, wherein each of the base plates is fastened to the roof frame and to one of the lateral roof pillars by fastening screws.

15. The motor vehicle of claim 14, wherein the fastening screws include a central fastening screw connecting the base plate to limbs of the lateral roof pillar.

16. The motor vehicle of claim 15, wherein the fastening screws further comprise end fastening screws, said base plate is fixed directly in the roof frame via the end fastening screws disposed on opposite longitudinal ends of the central fastening screw.

17. The motor vehicle of claim 12, wherein the arms on each of the supporting elements have free ends facing each other in the inoperative position, each of the free ends having a notch formed therein into which a handling tool can be hooked for pivoting the arms up from the inoperative position into the operative position.

18. The motor vehicle of claim 12, wherein each of the base plates has oblique supporting surfaces in proximity to ends of the arms that are pivotally connected to the base plate, said oblique supporting surfaces being engaged in a clamping manner with corresponding oblique surfaces of the arms when the arms are in the operative position for holding the respective arm in the operative position.

* * * * *